3,084,122
STABILIZED DEXTRAN SOLUTIONS
Jacob D. Cypert and John T. Patton, Tulsa, Okla., assignors to Jersey Production Research Company, a corporation of Delaware
No Drawing. Filed June 17, 1960, Ser. No. 36,707
17 Claims. (Cl. 252—8.55)

The present invention relates to methods for improving the stability of polysaccharide solutions and more particularly relates to means for reducing viscosity losses during the use and storage of aqueous solutions containing polysaccharides prepared by bacterial fermentation. In still greater particularity, the invention relates to the use of hydroxy halogenated diphenyl methanes for stabilizing the viscosity of aqueous solutions thickened with dextran.

There has been growing interest in recent years in the development of more effective materials for thickening aqueous solutions to be used in oilfield secondary recovery operations. Test results have demonstrated that the use of viscous solutions in place of the water or brine normally employed for waterflooding purposes results in a significant increase in the amount of oil which can be displaced from a subsurface reservoir during a waterflooding operation. The primary reason for this increase is that water and similar displacing agents having viscosities much lower than that of the oil normally found in subsurface reservoirs tend to finger through the more permeable zones of such reservoirs and thus bypass the less permeable zones. The sweep efficiency is low because the displacing agent does not contact all portions of the reservoir. Much of the recoverable oil remains in place even in those portions of the reservoir actually contacted by the displacing agent. It has been found that the addition of thickening agents to water or brine in concentrations sufficient to give viscosities more nearly equivalent to that of the oil reduces this fingering tendency and promotes more uniform, piston-like displacement. Some authorities have estimated that the use of thickened water in waterflooding projects carried out in the past would have increased the total amount of oil recovered as a result of such projects by a factor of at least 25 percent.

The principal obstacle to the wide-spread use of viscous solutions in waterflooding processes carried out heretofore has been the lack of a suitable thickening agent. A variety of polymers, gums and resins have been advocated as useful for preparing such solutions but tests of these materials have demonstrated almost without exception that they are unsatisfactory. For the most part, the materials proposed in the past have been relatively expensive and must be used in concentrations which make their cost prohibitive. Solutions of many such materials tend to plug the pore spaces of the permeable rock which makes up most subsurface oil reservoirs and hence would not be satisfactory even if their use were economically feasible. Many thickeners suggested heretofore readily react with calcium and other salts found in oil reservoirs to form insoluble precipitates. Still other materials are adsorbed upon rock surfaces to such an extent that viscous solutions containing them lose their viscosity almost as soon as they are injected into the reservoir. The stringent requirements for a thickening agent to be used in waterflooding thus almost entirely rule out most water thickeners suggested by the prior art.

One of the most promising of the thickening agents suggested in the past is dextran, a polysaccharide produced by the action of *Acetobacter xylinum* on starch dextrins or by the action of *Leuconostoc mesenteroides* and related bacteria upon aqueous solutions containing cane sugar, beet sugar, molasses or a similar source of sucrose. It has been found that this polysaccharide, unlike many other thickening agents, is not adsorbed or degraded upon contact with rock surfaces. It is substantially non-plugging. The ions present in most subsurface reservoirs have little effect upon it. It is thermally stable over a wide range of temperatures. These properties make dextran superior to a wide variety of natural and synthetic polymers, gums and resins earlier considered for use in waterflooding operations.

The chief difficulty encountered in using dextran as a water thickener in oil field secondary recovery operations has been the instability of aqueous dextran solutions over extended periods of time. It has been found that the viscosities of such solutions normally decline in time and that the advantages obtained by using them for waterflooding purposes may therefore be largely limited to the initial stages of the waterflooding operation unless a much more viscous solution than would otherwise be required is utilized. This increases the amount of thickener which must be employed and makes it more difficult to inject the thickened water into the reservoir. The overall cost of waterflooding with a dextran solution is therefore somewhat higher than it would be if the solution were more stable and retained its viscosity for a longer period.

Efforts to improve the stability of dextran solutions in order to make them more attractive for use in waterflooding operations have met with only limited success. It has been found that the addition of formaldehyde to such solutions, alone or in combination with small amounts of calcium carbonate, results in some improvement in stability but that in many cases this improvement is not as great as is desired. Other stabilizing agents and perservatives which prevent the degradation of starches and similar materials have little effect upon the stability of solutions containing dextran.

The present invention provides a means for overcoming the difficulties outlined above. In accordance with the invention, it has now been found that the addition of small amounts of a hydroxy halogenated diphenyl methane to dextran solutions improves the stability of such solutions and reduces viscosity degradation during storage. Tests have shown that viscous solutions of dextran stabilized by the inclusion of both formaldehyde and a hydroxy halogenated diphenyl methane are particularly resistant to degradation. Such solutions are not adversely affected by relatively high temperatures and can be used and stored for extended periods without loss of their viscous properties. This obviates the necessity for using excessive quantities of dextran to compensate for viscosity degradation. Difficulties in pumping and handling due to changes in viscosity are avoided. The result is a significant reduction in the overall cost of waterflooding operations and similar processes in which aqueous dextran solutions are used.

The hydroxy halogenated diphenyl methanes employed for stabilizing dextran solutions in accordance with the invention are characterized by the general formula $$[C_6H_x(OH)_y(X)_z]_2CH_2$$

where X is a halogen atom, x ranges from 0 to 4 inclusive, y is an integer from 1 to 4 inclusive, z is an integer from 1 to 4 inclusive, and x+y+z total 5. Specific examples of such compounds include 2,2'-dihydroxy-5,5'-dichlorodiphenyl methane, 2,2'-dihydroxy-5,5'-difluorodiphenyl methane, 2,2'-dihydroxy-5,5'-dibromodiphenyl methane, 2,2'-dihydroxy-5,5'-diiododiphenyl methane, 2,2'-dihydroxy-4,5,4',5'-tetrachlorodiphenyl methane, 2,2'-dihydroxy-3,5,6,3',5',6'-hexachlorodiphenyl methane, 2,2'-dihydroxy-3,5,6,3',5',6'-hexabromodiphenyl methane, 2,5,2'5'-tetrahydroxy - 6,6' - dichlorodiphenyl methane, 2,2'-dihydroxy-3,4,5,6,3',4',5',6'-octachlorodiphenyl methane, 4,4'-dihydroxy-5,5'-difluorodiphenyl methane, and 2,4,5,6,2',4',5',6'-octahydroxy-3,3'-dichlorodiphenyl methane.

The dihydroxy-chlorodiphenyl methanes are preferred. The 2,2'-dihydroxy-5,5'-dichlorodiphenyl methane and the 2,2'-dihydroxy-3,5,6,3',5',6'-hexachlorodiphenyl methane have been respectively designated as "dichlorophene" and "hexachlorophene" by the counsel on pharmacy and chemistry of the American Medical Association. These compounds are widely used as agricultural fungicides; as germicides in soaps, shampoos and similar preparations; and as veterinary medicines. They may be purchased from commercial sources and because of their ready availability and relatively low cost are preferred for purposes of the invention.

In the relatively pure state, the above-described compounds are dry, free-flowing solids and in most cases are white or light tan in color. They are substantially insoluble in distilled water but readily dissolve in slightly alkaline aqueous solutions. Dextran solutions frequently have pH values sufficiently high to render the compounds soluble. In the case of neutral or low pH dextran solutions, however, a small amount of an alkali metal or alkaline earth metal hydroxide can be added to the solutions to promote solubility of the stabilizing agents. If desired, the hydroxy halogenated diphenyl methanes can be treated with sodium hydroxide, potassium hydroxide or a similar base in order to convert them into water soluble salts before they are added to the dextran solution.

The hydroxy halogenated diphenyl methanes are generally employed in dextran solutions in concentrations between about 0.001 percent by weight and about 1.0 percent by weight. The precise concentration employed will, of course, depend upon the particular purpose for which the dextran solution is to be used. Concentrations between about 0.05 percent and about 0.5 percent by weight have been found satisfactory for most purposes and are preferred.

The stabilizing action of the hydroxy halogenated diphenyl methanes upon dextran solutions is not fully understood. Although the compounds are bactericides, their stabilizing effect does not appear to be a function of their bactericidal activity. Tests have shown that many potent bactericides have little or no effect upon dextran stability and that the hydroxy halogenated diphenyl methanes markedly improve the stability of sterile dextran solutions. It is believed that the substituted methanes may react with the dextran molecule to form compounds or complexes and that these may be responsible for the improved stability. There are, of course, other mechanisms by means of which the substituted diphenyl methanes may promote dextran stability and hence the invention is not to be restricted to any particular explanation for the improved results obtained.

The hydroxy halogenated diphenyl methanes utilized in accordance with the invention for stabilizing dextran solutions are particularly effective when employed in conjunction with formaldehyde. It is preferred to add from about 0.1 to about 5.0 weight percent of formaldehyde and from about 0.001 to about 1.0 weight percent of hydroxy halogenated diphenyl methane to such solutions. For ease of handling, the formaldehyde is normally added in the form of an aqueous solution. Formalin, a 40% solution of formaldehyde in water, may be conveniently utilized. The use of from about 0.1 weight percent to about 1.0 weight percent formaldehyde and from about 0.05 to 0.5 weight percent hydroxy halogenated diphenyl methane is preferred.

Stabilized dextran solutions prepared in accordance with the invention for use in waterflooding operations may be produced by simply adding commercial dextran, formaldehyde and hexachlorophene or a similar hydroxy halogenated diphenyl methane to the water or brine to be used. Alternatively, a viscous solution of dextran can be prepared on the site by fermenting an aqueous medium containing cane sugar, beet sugar, molasses or a similar sucrose with Leuconostoc mesenteroides or related bacteria, diluting the solution with water or brine to obtain the desired viscosity, and thereafter adding the formaldehyde and substituted diphenyl methane to stabilize the solution. Fermentation processes by means of which dextran can be produced will be familiar to those skilled in the art and need not be set forth in detail to permit an understanding of the present invention.

The dextran concentration necessary for the effective displacement of oil from an underground reservoir by means of a stabilized dextran solution under a given set of conditions can readily be determined by calculating the mobility ratio for the system at hand. The mobility ratio is a measure of the volume of displacing fluid which will be required to reduce the oil content of a reservoir to an ultimate equalibrium value. It is defined by the relationship $$MR = \frac{V_o K_w}{V_w K_o}$$

where K designates the reservoir permeability, V represents the viscosity and the subscripts $w$ and $o$ denote water and oil respectively. A mobility ratio of unity indicates that the water and the oil will move through the reservoir in the presence of one another with equal ease. A given volume of water at a mobility ratio of less than 1 will displace a markedly greater volume of oil from a reservoir than will the same amount of water at a mobility ratio greater than 1. Where practical, the concentration of the dextran in the flood water should be sufficient to give a mobility ratio less than 1. To obtain such a mobility ratio, viscosities between about 2 centipoises and about 30 centipoises or higher should ordinarily be used. This normally necessitates the use of from about 0.1 percent to about 4 percent dextran by weight.

In waterflooding operations carried out with the improved dextran solutions of the invention, thickened water is injected into the reservoir through one or more injection wells and produced fluids are recovered through one or more production wells. Dextran solution may be injected throughout the entire operation if desired. Satisfactory results can generally be obtained, however, by injecting dextran solution only during the initial stages of the operation. This leads to the establishment of a bank of viscous solution in the reservoir surrounding the injection wells. Ordinary water containing no thickener can then be injected in order to propel the bank of thickened water through the reservoir toward the production well. The volume of dextran solution used in an operation of this type should be sufficient to prevent the later-injected water from breaking through the bank and contacting the reservoir in advance of the viscous solution. A diminishing concentration of dextran beginning at the leading edge of the bank and continuing to the trailing edge is generally preferable in order to avoid a premature breakthrough of ordinary water.

The thickness of the bank of dextran solution used will obviously depend upon the distance over which it is to be propelled, the nature of the porous rock in the reservoir, and the viscosity of the solution itself. In an operation carried out with a single injection well and one or more production wells spaced a distance of 600 feet from the injection well, for example, a bank of from about 100 to about 400 feet thick should ordinarily be established in the vicinity of the injection well in order to assure that the bank will persist during the entire waterflooding operation. The volume of dextran solution necessary to establish such a bank can readily be calculated from information as to the distance between the injection point and the most remote production well, the average thickness of the reservoir, and the average porosity of the reservoir. Such information is normally available with respect to any reservoir in which a secondary recovery operation is to be carried out. As a general rule, the volume of viscous water used will constitute from about 5 to about 50 percent of the reservoir pore volume being flooded and will preferably amount to at least 10 percent of the pore volume.

Waterflooding operations are conventionally carried out using regular flooding patterns. The patterns utilized may not cover the entire reservoir and hence the volume of the reservoir for purposes of the particular flooding operation is normally considered to be the volume of that portion of the reservoir underlying the lateral area defined by the flood pattern. In a large reservoir, several flood patterns may be carried out simultaneously. In using a stabilized dextran solution in such an operation, the volume of the reservoir underlying the flood pattern rather than the total reservoir volume should be considered in determining the quantity of dextran solution needed. In line-drive floods, for example, it is normally assumed that the pore volume of the reservoir under flood between each line of injection wells and an adjacent line of production wells is the total pore volume of the reservoir underlying the lateral area between the two lines. The quantity of stabilized dextran solution to be injected through the line of injection wells toward the adjacent line of producing wells should then preferably be at least 10 percent of the total reservoir volume underlying the area between the two lines.

Dextran solutions stabilized in accordance with the invention for use in waterflooding operations may be employed in combination processes which include a waterflooding step. It has been found advantageous in some cases, for example, to inject air or gas into a reservoir prior to waterflooding in order to reduce the relative permeability of the reservoir to water. This reduces the volume of water required and permits improved oil recovery. The improved stability of dextran solutions containing formaldehyde and substituted diphenyl methanes permits improved results from such combination processes.

The substituted diphenyl methanes employed in accordance with the invention may be utilized in conjunction with other additives suggested for use in aqueous solutions thickened with dextran in the past. Chemical and radioactive tracers, for example, may be incorporated in solutions to be used in waterflooding operations in order to permit a check upon the progress of the front. Before such materials are used, care should of course be taken to ascertain the materials selected do not adversely affect the viscosity of the stabilized dextran solution.

It will be recognized that use of the stabilized dextran solutions of the invention is not limited to waterflooding operations. Dextran is employed in aqueous solution in drilling muds and other fluids used for the drilling, completion and treatment of oil and gas wells. It is useful in many cosmetic preparations. It may be employed in certain pharmaceutical compositions. The improved stability attained by the addition of substituted diphenyl methanes to dextran solutions permits the use of such solutions in many compositions wherein an emulsifying, suspending or thickening agent is required.

The stabilizing effect of the hydroxy halogenated diphenyl methanes upon aqueous dextran solutions can be seen by considering the results obtained when hexachlorophene, 2,2' - dihydroxy - 3,5,6,3',5',6'-hexachlorodiphenyl methane was added to a dextran solution and the solution was thereafter aged at an elevated temperature. The solution employed was prepared from a synthetic Lake Maracaibo brine containing 895 p.p.m. of sodium chloride, 140 p.p.m. of sodium sulfate, 67 p.p.m. of sodium bicarbonate, 89 p.p.m. of calcium chloride, 10 p.p.m. of calcium carbonate and 135 p.p.m. of magnesium chloride. To this brine was added about 2 weight percent of dextran purchased from a commercial supplier. The resulting viscous solution was then divided into two portions. One portion was used as a control; while the other was stabilized by adding to it 0.02 weight percent of hexachlorophene. The viscosities of the two samples at 80° F. were measured with the Brookfield viscometer. The samples were then placed in a thermostatically controlled oven and aged at a temperature of 150° F. Viscosity measurements were made at intervals. The results obtained are set forth in Table I below.

TABLE I

*Effect of Hexachlorophene Upon the Stability of Aqueous Dextran Solutions*

| Aging Time, Days at 150° F. | Viscosity at 80° F., Centipoises | |
|---|---|---|
| | Control Dextran Solution | Dextran Solution Containing 0.02 Wt. percent Hexachlorophene |
| 0 | 20.0 | 22.6 |
| 1 | 13.6 | 16.0 |
| 4 | 5.2 | 13.0 |
| 8 | 4.0 | |
| 11 | | 8.2 |

The data set forth in Table I show that the hexachlorophene markedly increased the stability of the dextran solution. Despite the very low concentration in which the additive was used, the viscosity of the solution containing hexachlorophene was 8.2 centipoises after 11 days; whereas that of the control solution had declined to only 4 centipoises after only 8 days. Where the hydroxy halogenated diphenyl methanes are used alone, it is preferred to employ them in somewhat higher concentrations than are employed where formaldehyde is also used. The fact that the above data were obtained in brine solution demonstrates that salts normally found in connate waters do not adversely affect the stabilizing action of the compounds and that they can be employed in drilling muds and similar solutions containing similar salts.

The improved stability which results when hydroxy halogenated diphenyl methanes are added to dextran solutions containing formaldehyde is illustrated by data obtained in comparative aging tests similar to that described above. In the first of these tests, two viscous solutions were prepared by dissolving two weight percent of a purified dextran in water. The dextran employed was obtained from a commercial source. To each solution was added 0.4 weight percent of formaldehyde as formalin and 10 parts per million of calcium carbonate. The viscosities of the solutions thus prepared were measured at a temperature of 80° F. by means of a Brookfield viscometer. Tests of the solutions for bacterial activity showed them to be sterile.

Two-tenths of one percent by weight of the sodium salt of dichlorophene, 2,2' - dihydroxy - 5,5' - dichlorodiphenyl methane, was added to one of the dextran solutions prepared as described above. The second solution containing no dichlorophene salt was used as a control. These solutions were placed in an oven and aged at a temperature of 150° F. for a period of 21 days. The viscosity of each solution was measured at intervals during the 21-day period. The data obtained are shown in Table II.

TABLE II

*Effect of Dichlorophene Upon the Stability of Aqueous Dextran Solutions Containing Formaldehyde*

| Aging Time, Days at 150° F. | Viscosity at 80° F., Centipoises | |
|---|---|---|
| | Control Dextran Solution | Dextran Solution Containing 0.2 Wt. Percent Sodium Salt of Dichlorophene |
| Initial | 27.0 | 25.2 |
| 1 | 19.4 | 21.0 |
| 4 | 16.1 | 26.2 |
| 11 | 16.6 | 23.2 |
| 15 | 15.6 | 24.0 |
| 21 | 15.3 | 25.4 |

From the above table it can be seen that the viscosity of the control dextran solution decreased markedly during the 21-day aging period. The viscosity of the solution containing the dichlorophene salt, on the other hand, remained essentially unchanged during the aging period. Since both solutions had been rendered sterile by the addition of formaldehyde and there was no evidence of bacterial activity at the conclusion of the test, it is apparent that the loss of viscosity of the control solution was not due to bacterial degradation and that the dichlorophene did not function simply as a bactericide in improving dextran stability.

Another test similar to that described above was carried out using hexachlorophene, 2,2'-dihydroxy-3,5,6,3', 5'6'-hexachlorodiphenyl methane, in place of the dichlorophene used in the preceding test. The solution employed was prepared from a synthetic Lake Maracaibo brine containing 895 p.p.m. of sodium chloride, 140 p.p.m. of sodium sulfate, 67 p.p.m. of sodium bicarbonate, 89 p.p.m. of calcium chloride, 10 p.p.m. of calcium carbonate, and 135 p.p.m. of magnesium chloride. To this brine was added 2 weight percent of commercial dextran and 0.5 weight percent of formalin. Addition of the formalin killed the bacteria present in the solution and rendered it sterile. Hexachlorophene was then added to the solution as the sodium salt in a concentration of 0.01 weight percent. The solution was placed in a thermostatically controlled oven and maintained at a temperature of 150° F. for a period of 42 days. Samples were withdrawn at intervals and tested for viscosity by means of the Brookfield viscometer at 80° F. The results of the viscosity measurements are shown below.

TABLE III

*Effect of Hexachlorophene Upon the Stability of Aqueous Dextran Solutions Containing Formaldehyde*

| Aging Time, Days at 150° F. | Viscosity of Dextran Solution Containing 0.01 Wt. Percent Hexachlorophene, Centipoises at 80° F. |
|---|---|
| 1 | 17.4 |
| 5 | 17.6 |
| 14 | 17.4 |
| 28 | 18.8 |
| 42 | 21.6 |

Again it can be seen that dextran solutions containing formaldehyde and the halogenated hydroxy diphenyl methanes utilized in accordance with the solution are remarkably stable and do not lose their viscosity when held at high temperatures for extended periods. The data again show that salts normally present in brines do not interfere with the stabilizing action of the compounds.

Additional data obtained by using mercuric chloride and acetaldehyde, both potent bactericides, in tests similar to those described above demonstrate that the stabilizing effect of the halogenated hydroxy diphenyl methanes is not shared by these compounds. These data are set forth in Table IV.

TABLE IV

*Effect of Bactericides Upon the Stability of Aqueous Dextran Solutions Containing Formaldehyde*

| Aging Time, Days at 150° F. | 2 Wt. Percent Dextran Solution Containing 0.35 Wt. Percent Formalin and 0.0005 Wt. Percent Mercuric Chloride | 2 Wt. Percent Dextran Solution Containing 0.333 Wt. Percent Formalin and 0.167 Wt. Percent Acetaldehyde [1] |
|---|---|---|
| 0 | 25.6 | 25.0 |
| 3 | 19.4 | |
| 4 | | 15.4 |
| 8 | | 14.8 |
| 10 | 18.0 | |
| 14 | | 11.4 |
| 20 | 15.2 | |
| 26 | | 7.0 |
| 33 | 10.8 | 4.8 |

[1] Aged in presence of Bachaquero sand.

It can be seen from the above data that the mercuric chloride and acetaldehyde, despite their bactericidal properties, did not significantly improve the stability of the dextran solutions to which they were added. The viscosities decreased in storage at 150° F. at about the same rate as that of the control solution containing formalin which was used in obtaining the data shown in Table II. These data further demonstate that bactericidal activity is not responsible for the stabilizing action of the hydroxy halogenated diphenyl methanes.

What is claimed is:

1. An aqueous dextran solution which has been stabilized against viscosity degradation by the incorporation therein of from about 0.001 wt. percent to about 1.0 wt. percent of a compound having the formula $$[C_6H_x(OH)_y(X)_z]_2CH_2$$

where X is a halogen atom, $x$ ranges from 0 to 4 inclusive, $y$ is an integer from 1 to 4 inclusive, $z$ is an integer from 1 to 4 inclusive, and $x+y+z$ total 5.

2. A solution as defined by claim 1 containing from about 0.1 to about 5.0 wt. percent formaldehyde.

3. A solution as defined by claim 1 wherein said compound is 2,2'-dihydroxy-5,5'-dichlorodiphenyl methane.

4. A solution as defined by claim 1 wherein said compound is 2,2'-dihydroxy-3,5,6,3',5',6'-hexachlorodiphenyl methane.

5. An aqueous dextran solution to which has been added from about 0.1 wt. percent to about 5.0 wt. percent of formaldehyde and from about 0.001 to about 1.0 wt. percent of a hydroxy halogenated diphenyl methane having the formula $$[C_6H_x(OH)_y(X)_z]_2CH_2$$

where X is a halogen atom, $x$ ranges from 0 to 4 inclusive, $y$ is an integer from 1 to 4 inclusive, $z$ is an integer from 1 to 4 inclusive, and $x+y+z$ total 5.

6. A solution as defined by claim 5 wherein said hydroxy halogenated diphenyl methane is 2,2'-dihydroxy-5,5'-dichlorodiphenyl methane.

7. A solution as defined by claim 5 wherein said hydroxy halogenated diphenyl methane is 2,2'-dihydroxy-3,5,6,3',5',6'-hexachlorodiphenyl methane.

8. A solution as defined by claim 5 wherein said formaldehyde is present in a concentration of from about 0.1 wt. percent to about 1.0 wt. percent.

9. A solution as defined by claim 8 wherein said hydroxy halogenated diphenyl methane is present in a concentration of from about 0.05 wt. percent to about 0.5 wt. percent.

10. An aqueous medium containing dextran as a viscosity builder to which has been added from about 0.001 wt. percent to about 1.0 wt. percent of a dihydroxychlorodiphenyl methane.

11. A medium as defined by claim 10 to which has also been added from about 0.1 to about 5.0 wt. percent of formaldehyde.

12. An aqueous dextran solution to which has been added sufficient formaldehyde to render said solution sterile and from about 0.001% to about 1.0% by weight of a hydroxy halogenated diphenyl methane having at least one hydroxyl group and at least one halogen atom attached to each phenyl group.

13. A solution as defined by claim 12 wherein said hydroxy halogenated diphenyl methane is 2,2'-dihydroxy-5,5'-dichlorodiphenyl methane.

14. A secondary recovery process for displacing oil from a subsurface oil reservoir which comprises injecting a stabilized dextran solution into said reservoir through at least one injection well and recovering oil displaced by said dextran solution through at least one production well, said dextran solution being stabilized by the incorporation therein of from about 0.001 wt. percent to about 1.0 wt. percent of a hydroxy halogenated diphenyl methane characterized by the formula $$[C_6H_x(OH)_y(X)_z]_2CH_2$$

where X is a halogen atom, $x$ ranges from 0 to 4 inclusive, $y$ is an integer from 1 to 4 inclusive, $z$ is an integer from 1 to 4 inclusive, and $x+y+z$ total 5.

15. A process as defined by claim 14 wherein said dextran solution contains from about 0.1 wt. percent to about 5.0 wt. percent formaldehyde and from about 0.05 wt. percent to about 0.5 wt. percent of said hydroxy halogenated diphenyl methane.

16. An improved waterflooding process which comprises injecting an aqueous solution containing from about 0.1 to about 4.0 wt. percent of dextran, from about 0.1 to about 5.0 wt. percent of formaldehyde, and from about 0.001 to about 1.0 wt. percent of 2,2'-dihydroxy-5,5'-dichlorodiphenyl methane into a subsurface oil-bearing reservoir through at least one injection well and recovering oil displaced by said solution from said reservoir through at least one production well.

17. An improved waterflooding process which comprises injecting an aqueous solution containing from about 0.1 to about 4.0 wt. percent of dextran, from about 0.1 to about 5.0 wt. percent of formaldehyde, and from about 0.001 to about 1.0 wt. percent of 2,2'-dihydroxy-3,5,6,3',5',6'-hexachlorodiphenyl methane into a subsurface oil-bearing reservoir through at least one injection well and recovering oil displaced by said solution from said reservoir through at least one production well.

References Cited in the file of this patent

UNITED STATES PATENTS

| | | |
|---|---|---|
| 2,334,408 | Gump | Nov. 16, 1943 |
| 2,341,500 | Detling | Feb. 8, 1944 |
| 2,354,012 | Gump | July 18, 1944 |
| 2,360,327 | Bailey et al. | Oct. 17, 1944 |
| 2,364,434 | Foster | Dec. 5, 1944 |
| 2,480,556 | Craige et al. | Aug. 30, 1949 |
| 2,602,082 | Owen | July 1, 1952 |
| 2,731,414 | Binder et al. | Jan. 17, 1956 |
| 2,868,725 | Owen | Jan. 13, 1959 |
| 2,908,597 | Owen | Oct. 13, 1959 |